Dec. 30, 1958
E. D. GEORGE
2,866,501
APPARATUS FOR SIPING TIRES
Filed Aug. 20, 1956
5 Sheets-Sheet 1
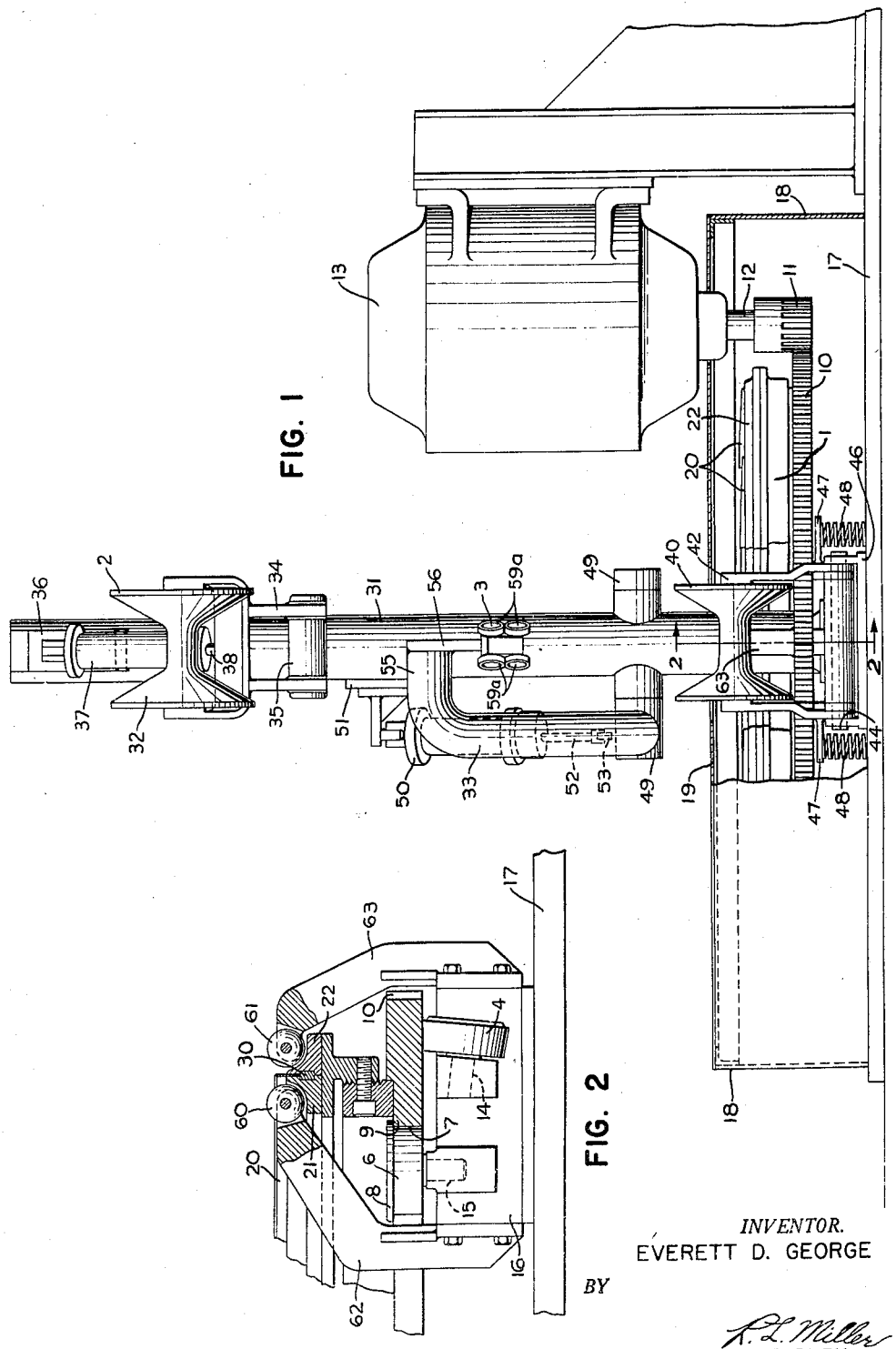
INVENTOR.
EVERETT D. GEORGE
BY
*P. L. Miller*
ATTORNEY Dec. 30, 1958  E. D. GEORGE  2,866,501
APPARATUS FOR SIPING TIRES
Filed Aug. 20, 1956  5 Sheets-Sheet 2

INVENTOR.
EVERETT D. GEORGE
BY
*R. L. Miller*
ATTORNEY

Dec. 30, 1958     E. D. GEORGE     2,866,501

APPARATUS FOR SIPING TIRES

Filed Aug. 20, 1956     5 Sheets-Sheet 3

*INVENTOR.*
EVERETT D. GEORGE

BY

*R. L. Miller*
ATTORNEY

INVENTOR.
EVERETT D. GEORGE

Dec. 30, 1958     E. D. GEORGE     2,866,501
APPARATUS FOR SIPING TIRES
Filed Aug. 20, 1956     5 Sheets-Sheet 5

INVENTOR.
EVERETT D. GEORGE
BY
ATTORNEY

United States Patent Office 2,866,501
Patented Dec. 30, 1958

2,866,501

APPARATUS FOR SIPING TIRES

Everett D. George, Cuyahoga Falls, Ohio, assignor to The Goodyear Tire & Rubber Company, Akron, Ohio, a corporation of Ohio Application August 20, 1956, Serial No. 605,000

10 Claims. (Cl. 164—10.2)

This invention relates to a method and apparatus for treating tire treads, and more particularly it relates to an apparatus for slitting tire treads transversely for the purpose of improving the anti-skid properties of the tread. For certain types of tires, it is advantageous to sipe or slit only certain portions of the tread surface. For example in passenger tires only the shoulder portions of the tire are siped because laminates formed by sipes at the center of the tread tend to tear out due to centrifugal force at high speed operation of the tire. Several methods and apparatus are known for siping or slitting only certain portions of the tread surface but in all known methods the tire is siped while on a rim or the portions are cut in more than one revolution of the tire.

An object of this invention is to provide an economical, automatic, high-speed device for slitting tires transversely of the tread in one revolution of the tire without slitting certain portions thereof.

A further object is to provide an apparatus for slitting tire treads having means for supporting the tire and insuring an accurate depth of cut, and for deforming the tread surface of the tire so that only certain portions of the tread are cut.

Another object is to provide an apparatus for slitting tire treads without mounting the tire on a rim and having means for deforming the tread surface in the area of the cutting means so that only certain portions of the tread surface are cut during each pass of the knife.

These and other objects and advantages will appear more fully in the following detailed description and in the accompanying drawings in which Fig. 1 is a front elevational view with parts broken away showing the tire slitting apparatus embodying a preferred form of this invention;

Fig. 2 is a cross sectional view taken along the lines 2—2 of Fig. 1;

Figure 3:
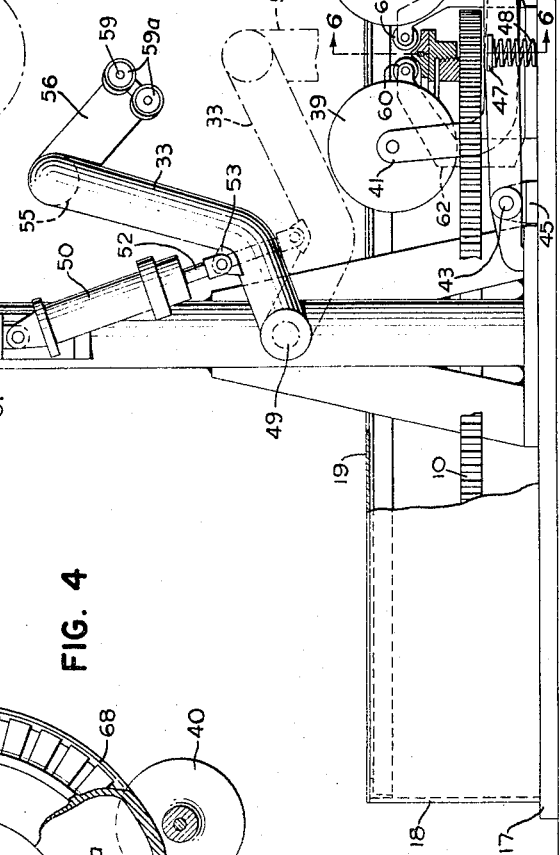
Fig. 3 is a side elevational view with parts broken away showing the tire slitting apparatus of this invention.

Referring to Fig. 1 of the drawings, the apparatus consists of a continuously rotating knife carriage 1, a tire-supporting mechanism 2, and a tire tread deforming device 3.

*Knife and drive mechanism*

The knife carriage 1 is supported for rotation in a fixed plane upon the rollers 4 rotating about a horizontal axis and rollers 6 rotating about a vertical axis. As shown in Fig. 2, the rollers 6 contact the radially inner surface 7 of the carriage to prevent lateral movement of the carriage. The rollers 6 are further provided with a flange 8 contacting a flange 9 on the carriage 1 so as to prevent vertical movement of the carriage. The outer periphery of the carriage is provided with gear teeth 10 which engage with the gear 11 attached to the drive shaft 12 of the motor 13. The rollers 4 and 6 are supported on stub shafts 14 and 15 secured to stands 16 attached to the base plate 17. The base plate 17 is provided with sides 18 and a cover plate 19 to form an enclosure about the cutting carriage.

A plurality of segmental arcuate knives or cutters 20 are secured to the carriage 1 in eccentric or helical relation to the axis of rotation of the carriage. Each of the cutters 20 is preferably supported between radially inner holders 21 and radially outer holders 22 secured to the carriage 1 by suitable studs 23. A spacer member 27 is interposed between the respective leading and trailing edges 25 and 26 of the knives to hold the edges apart a distance equal to the distance between the individual slits desired to be cut in the tire 28. The spacer 27 is secured to the knives by bolts 29 which pass through the holders 21 and 22 and the leading and trailing edges 25 and 26 of the longitudinally adjacent knives. A key 30 having a length equal to the knives is positioned in a key way formed in the contacting surfaces of the holders and provides a base for supporting the lower edge of the knives to maintain the exposed or cutting edges in a fixed plane relative to the holders.

It is evident that one revolution of the carriage will impart a number of slits to the tread of the tire equal to the number of cutters secured to the carriage, and if the leading edge of any one of the cutters completes a cut the cutter will follow through the slit and displace the tire tread a distance equal to the distance between the respective overlapping trailing and leading edges 25 and 26 of the cutters before the next succeeding leading edge begins a new cut.

*Tire supporting mechanism*

Referring to Figs. 1 and 3 of the drawings, the tire supporting means 2 comprises a vertical frame 31 secured to the center of the base plate 17. The frame 31 provides a support for the roller 32 and for the arm 33 which supports the tire tread deforming means which will be hereinafter described more in detail. The roll 32 is rotatably mounted at the outer end of arm 34 which is pivotably mounted to the bracket 35 secured to the frame 31. The upper end of the frame 31 is provided with a bracket 36 for pivotably supporting the air cylinder 37 having a piston rod 38 which is pivotably secured to the arm 34.

Referring further to Fig. 3, a pair of rollers 39 and 40 are respectively rotatably mounted on arms 41 and 42. The arms 41 and 42 are respectively pivotably mounted on pins 43 and 44 which are supported in bearing supports 45 and 46 secured to the base plate 17. Each of the arms 41 and 42 is provided with a lug 47 engaged by a spring 48 which urges the arms 41 and 42 into an upper position shown by the solid lines in Fig. 3.

Figure 4:
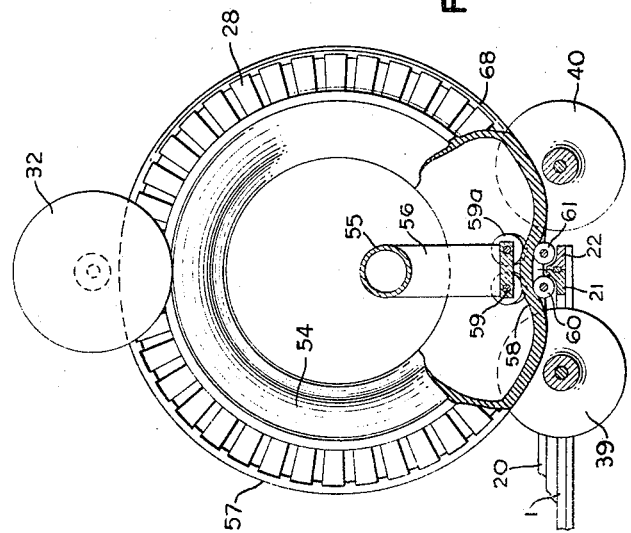
Fig. 4 is a side elevational view with parts broken away showing the apparatus of this invention in operative position.
Figure 5:
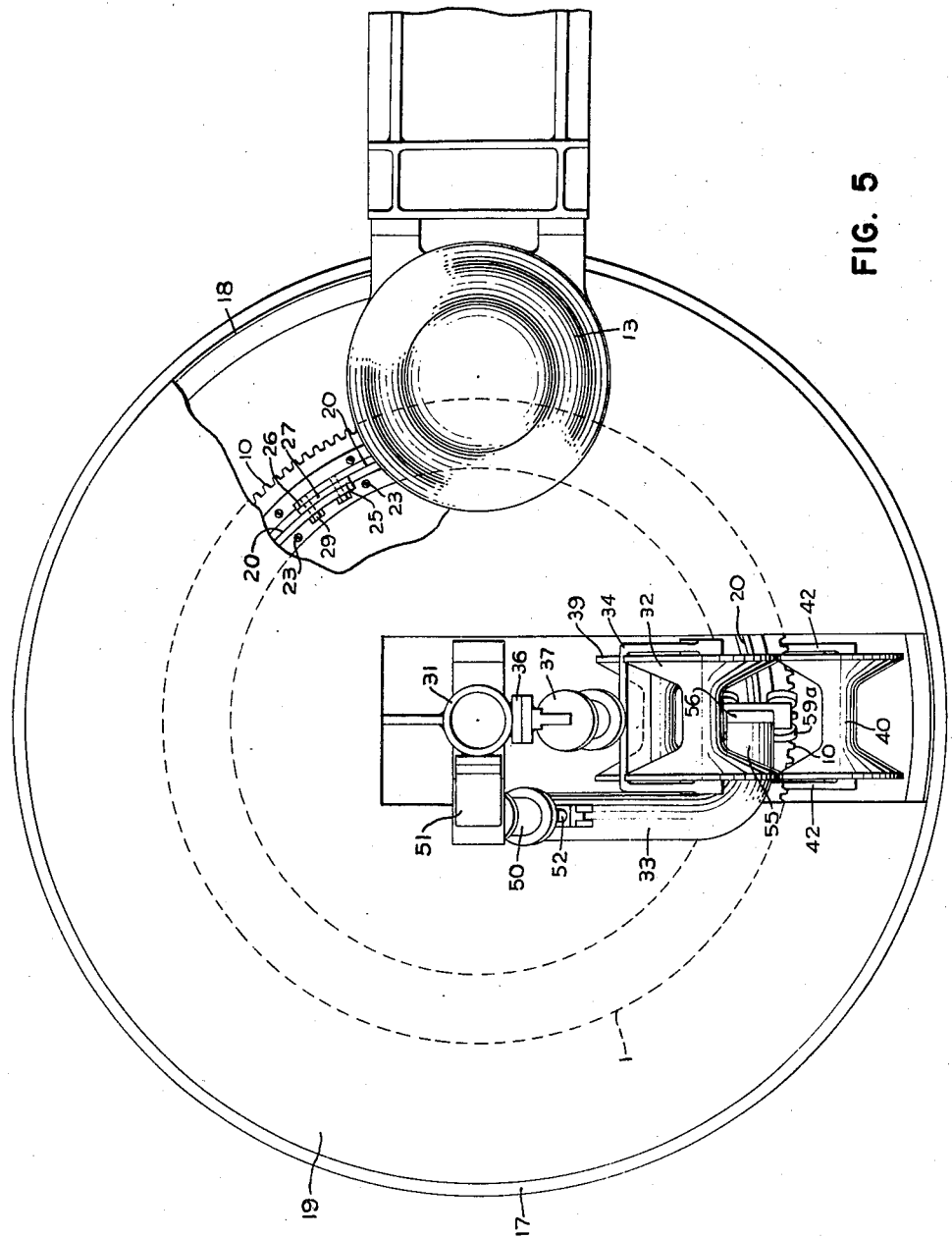
Fig. 5 is a plan view of the slitting apparatus with parts broken away showing the knife carriage and drive thereof.

When the cylinder 37 is actuated, the arm 34 is pivoted about the bracket 35 causing the roll 32 to engage the tire 28 and force it downwardly against the rollers 39 and 40 causing them to move slightly apart into the position shown in Fig. 4. The tire is then engaged at three isolated and circumferentially spaced points by the concave surfaces of rolls 32, 39 and 40 so that the tire is resiliently and firmly held in a vertical plane.

*Tire tread deforming and depth control mechanism*

The frame 31 is provided with trunions 49 for pivotably supporting arm 33 which is actuated by an air cylinder 50 secured to the frame 31 by a bracket 51. The piston rod 52 is pivotably secured to the ear 53 fixed to the arm 33. The arm 33 pivots in a plane axially displaced from the sidewall 54 of the tire 28 and is provided with a laterally extending leg 55 having a depending leg 56 secured thereto which supports the tire tread deforming means engaging the inner surface of the tire.

Figure 6:
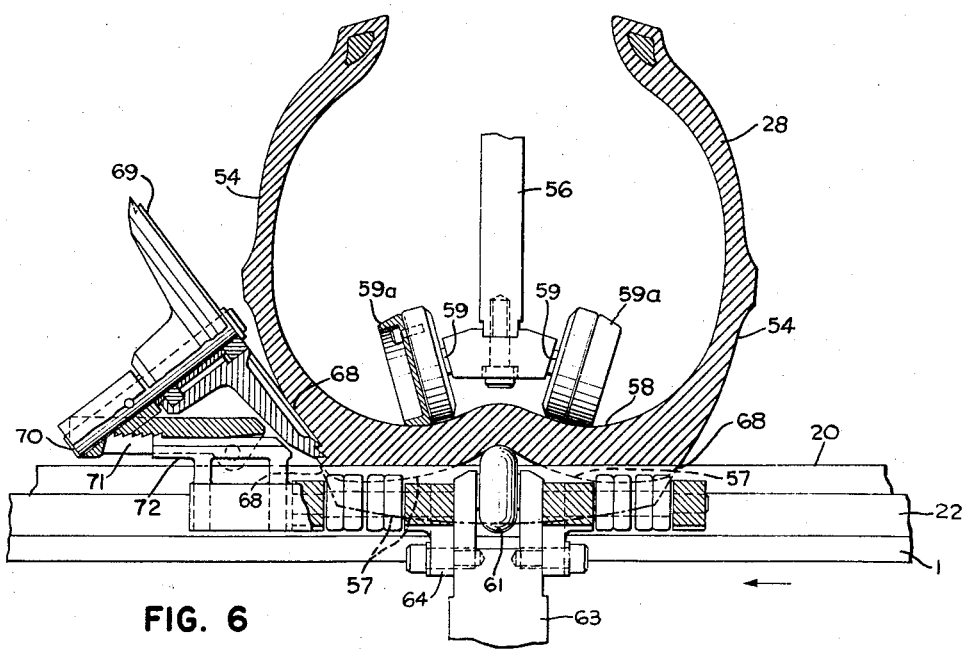
Fig. 6 is an enlarged cross sectional view taken along the lines 6—6 of Fig. 3 showing a tire in operative position on the tire tread deforming means.
Figure 7:
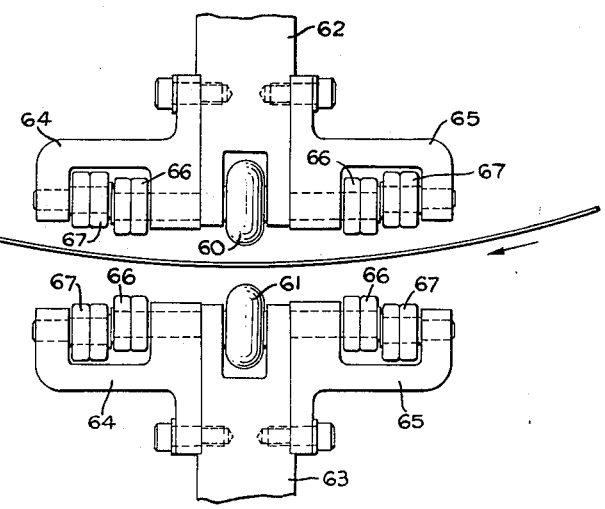
Fig. 7 is an enlarged plan view of the tire tread deforming means.

As best illustrated in Figs. 6 and 7, the tire tread deforming means comprises two sets of rollers, one set contacting the tread surface 57 of the tire and the other set contacting the inner surface 58 of the tire so as to bend the plane of the tread surface into a curve in cross section having a portion above the plane of the top edge of the knives. The depending portion 56 of arm 33 is preferably provided with a plurality of stub shafts 59 each of which is provided with a roller 59A contacting the inner surface 58. The rollers 59 are disposed laterally adjacent rollers 60 and 61 which contact the center of the tread surface 57. The rollers 60 and 61 are respectively mounted for rotation on supports 62 and 63 each of which is provided with a pair of brackets 64 and 65. Each of the brackets 64 and 65 support a pair of rollers 66 and 67 laterally of the rollers 60 and 61 for supporting the shoulder portion of the tire tread surface 57. The supports 62 and 63 are secured to one of the strands 16 and are disposed respectively on the radially inner and outer side of the path of travel of the cutters 20. As previously indicated, in operating position the rollers 60 and 61 are disposed above the plane of the top edge of the cutters 20 and the rollers 66 and 67 are disposed below the plane of the top edge of the knife.

With the arms 33, 34, 42 and 41 in inoperative position as shown by the solid lines in Fig. 3, the operator places the tire 28 on the rolls 39 and 40 and temporarily holds the tire in a vertical plane until the cylinders 37 and 50 are actuated to lower arms 34 and 33 simultaneously. As the cylinder 37 is actuated, the arm 34 is lowered so that roller 32 bears against the tread surface and forces the tire and rollers 39 and 40 downwardly against the bias of springs 48. Simultaneously the cylinder 50 is actuated and the arm 33 lowered until the rollers 59A contact the inner crown surface 58 of the tire and force the tread surface 57 initially against the rollers 60 and 61. Further movement of the rollers 59A cause the tread surface to bend or deform about the rollers 60 and 61 until the shoulder portion 68 of the tread surface engages the rollers 66 and 67 as shown in Fig. 6. It is thus seen that with the motor 13 energized and the knife carriage 1 rotating, the knives 20 pass only through the shoulder portions 68 of the tire, and since all of the supporting rollers and the deforming rollers are freely rotatable the helically extending knives 20 will cause the tire 28 to rotate about its own axis. After the tire 28 has been slit around the complete circumference of the tread surface 57, the cylinders 37 and 50 are actuated so as to retract the arms 34 and 56 and the rollers 39 and 40 are urged upwardly by spring 48 so as to disengage the tread 57 from the rotating knives 20.

During the slitting operation, passage of the knives through the tread tends to move the tread in the direction of the path of travel of the knife 1 shown in Fig. 6. In order to prevent this movement of the tread, and consequent inaccuracy in the location of the slits, a stabilizing wheel 69 is mounted for rotation about a shaft 70 disposed at an angle to the plane of the knives 20. The wheel 69 contacts the sidewall 54 of the tire immediately adjacent the tread thereof so as to provide additional support against lateral movement of the tire. The shaft 70 is journaled within the ratchet slide 71 mounted on a support 72. The slide 71 is provided with a ratchet so that the position of the wheel 69 may be adjusted relative to the rollers 60 and 61 to accommodate tires of varying size.

Figure 8:
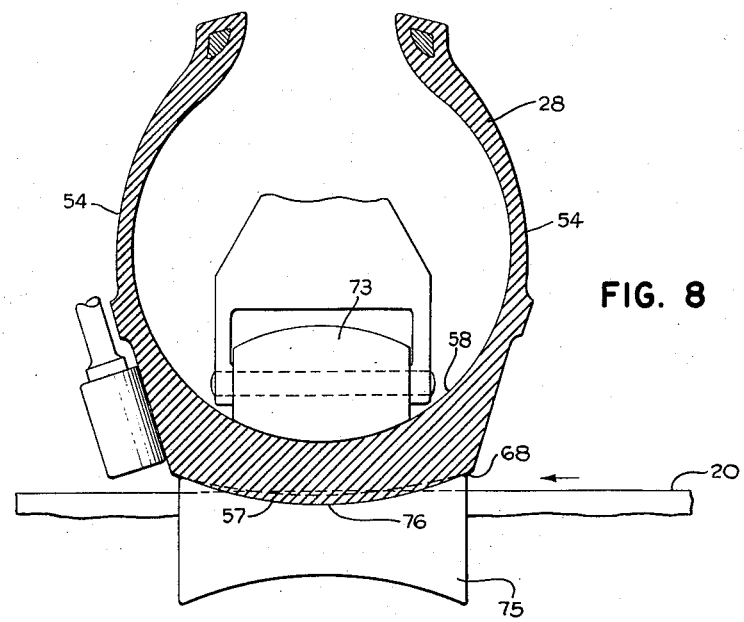
Fig. 8 is a cross sectional view similar to Fig. 6 showing another embodiment of the invention.
Figure 9:
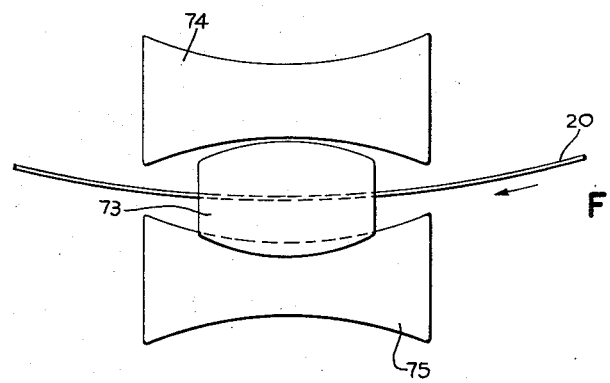
Fig. 9 is a plan view of the tire tread deforming means shown in Fig. 8.

Referring to Figs. 8 and 9, a modified form of the invention is shown wherein the shoulder portion 68 of the tire tread 57 is deformed above the plane of the top edge of the knives 20 and the center of the tread is deformed below the plane of the top edge of the knives so that the knife cuts only the center portion of the tire. In the present embodiment of the invention the depending member 56 supports roll 73 having a convex surface and the brackets 62 and 63 support rolls 74 and 75 having a concave surface. It is seen that as the roll 73 engages the inner surface 58 of the tire, the tread surface is deformed into a convex shape against the rollers 74 and 75 so that central portion 76 of the tread surface is substantially below the plane of the top edge of the knives and the shoulder portion 68 of the tread is positioned above the plane of the top edge of the knives.

It is evident that this invention provides an apparatus for slitting tire treads of unmounted tires wherein portions of the tread may be slit or cut and other portions of the tread uncut which results are accomplished in one revolution of the tire relative to the cutting knives.

While certain representative embodiments and details have been shown for the purpose of illustrating the invention, it will be apparent to those skilled in this art that various changes and modifications may be made therein without departing from the spirit or scope of the invention.

I claim:

1. An apparatus for transversely cutting the treads of tires to form transverse slits having a length less than the width of said tread comprising in combination means for supporting a tire for rotation, a cutting blade movable in a direction transversely of the tread and in a plane normal to the plane of the tread surface, a first roller means bearing against the tread surface of said tire and laterally of the path of said blade, said first roller means distorting portions of tread surface above the plane of the top edge of said blade whereby said blade cuts only certain predetermined portions of said tire tread.

2. An apparatus as claimed in claim 1 having a second roller means bearing against the inner crown surface of said tire and distorting portions of the tread surface of the tire below the plane of the top edge of said blade.

3. An apparatus as claimed in claim 2 in which a pair of first roller means are spaced circumferentially of said tread and said second roller means is disposed between said spaced pair of first roller means.

4. An apparatus as claimed in claim 1 having means contacting the sidewall of said tire adjacent the tread surface for preventing said tread from moving axially of the tire during the cutting operation.

5. An apparatus for transversely cutting the treads of tires to form transverse slits having a length less than the width of said tread comprising in combination means for supporting an uninflated tire for free rotation, a carriage rotatable in a plane adjacent the tread surface of the tire, said carriage having an axis of rotation substantially normal to said plane, means for driving the carriage, said carriage having at least one cutter blade axially projecting from said carriage and engaging the tread surface of said tire, said blade being helically disposed relative to the axis of rotation of said carriage, a first roller means bearing against the tread of said tire, and a second roller means bearing against the inner crown surface of said tire, portions of the tire-contacting surfaces of said first roller means engaging the tire tread above the top edge of the cutter and distorting a portion of the tread of the tire into a plane located above the top edge of said blade whereby said blade cuts only certain predetermined portions of said tire tread.

6. An apparatus as claimed in claim 5 in which said second roller means are supported for movement toward and away from the plane of the top edge of said blade.

7. An apparatus as claimed in claim 5 in which said portions of said first roller means engage the central portion of the tread surface and said second roller means engages portions of the inner crown surface displaced axially relative to said first roller means whereby the tread of the tire is distorted into a concave shape.

8. An apparatus as claimed in claim 5 in which said first roller means engages the shoulder portion of the tread surface and said second roller means engages the central portion of the inner crown surface whereby the tread of the tire is distorted into a convex shape.

9. An apparatus for transversely cutting the treads of tires to form transverse slits comprising in combination means for supporting a tire for free rotation, a carriage rotatable in a plane adjacent the tread surface of the tire, said carriage having an axis of rotation substantially normal to said plane, means for driving the carriage, said carriage having at least one cutter blade axially projecting from said carriage and engaging the tread surface of said tire, said cutter blade being helically disposed relative to the axis of rotation of said carriage, a pair of spaced first roller means bearing against the tread of said tire, and a second roller means bearing against the inner crown surface of said tire, portions of said first roller means contacting the tread of said tire above and below the plane of the top edge of said blade and a portion of said second roller means spaced laterally from said portion whereby said blade cuts only certain predetermined portions of said tire tread.

10. An apparatus as claimed in claim 9 in which said second roller means depresses a portion of the tread surface below the plane of said cutter edge.

References Cited in the file of this patent
UNITED STATES PATENTS

| | | |
|---|---|---|
| 1,280,753 | Juengst | Oct. 8, 1918 |
| 2,023,576 | Connelly | Dec. 10, 1935 |
| 2,214,461 | Hendry | Sept. 10, 1940 |
| 2,575,450 | Huff | Nov. 20, 1951 |
| 2,717,639 | James | Sept. 13, 1955 |
| 2,717,640 | Schnoehelen | Sept. 13, 1955 |
| 2,734,568 | Anderson | Feb. 14, 1956 |